United States Patent [19]
Ramanathan

[11] Patent Number: 5,850,592
[45] Date of Patent: Dec. 15, 1998

[54] METHOD FOR SELF-ORGANIZING MOBILE WIRELESS STATION NETWORK

[75] Inventor: Subramanian Ramanathan, Belmont, Mass.

[73] Assignee: GTE Internetworking Incorporated, Cambridge, Mass.

[21] Appl. No.: 584,492

[22] Filed: Jan. 11, 1996

[51] Int. Cl.⁶ .................................................. H04Q 7/20
[52] U.S. Cl. ............................................................ 455/7
[58] Field of Search .............................. 455/571, 7, 11.1, 455/13.1, 13.4

[56] References Cited

U.S. PATENT DOCUMENTS

| | | |
|---|---|---|
| 4,152,647 | 5/1979 | Gladden et al. . |
| 4,284,848 | 8/1981 | Frost . |
| 4,409,687 | 10/1983 | Berti et al. . |
| 4,613,990 | 9/1986 | Halpern ................................. 455/33.1 |
| 4,941,200 | 7/1990 | Leslie et al. ............................ 455/571 |
| 4,999,833 | 3/1991 | Lee . |
| 5,034,967 | 7/1991 | Cox et al. . |
| 5,050,189 | 9/1991 | Cox et al. . |
| 5,218,356 | 6/1993 | Knapp . |
| 5,303,286 | 4/1994 | Wiedeman . |
| 5,307,509 | 4/1994 | Michalon et al. . |
| 5,361,399 | 11/1994 | Linquist et al. ........................ 455/56.1 |
| 5,363,375 | 11/1994 | Chuang et al. . |
| 5,371,734 | 12/1994 | Fischer . |

FOREIGN PATENT DOCUMENTS 9429986  12/1994  WIPO .

*Primary Examiner*—William Cumming
*Attorney, Agent, or Firm*—Leonard Charles Suchyta; Floyd E. Anderson

[57] ABSTRACT

In the communications network disclosed herein, each of a plurality of similar stations is operated so that the group automatically organizes or configures itself into a multi-layered network for relaying messages from station to station, with some of the stations operating at a relatively high power level as message gateways for a cluster of stations operating at lower power thereby to form, through the gateways, a network backbone providing longer distance network links. Initially, individual stations attempt to affiliate at a lower power level with an existing cluster gateway and, if that attempt is unsuccessful, the station switches to a higher power level and commences operation as a cluster gateway. Each cluster gateway periodically communicates data at least identifying to other cluster gateways the non-gateway stations which are affiliated with it. Preferably, if a cluster gateway is within affiliation range with another cluster gateway one of them will terminate cluster gateway status if that termination will not reduce connectivity of the network backbone below a preselected level.

3 Claims, 5 Drawing Sheets

METHOD FOR SELF-ORGANIZING MOBILE WIRELESS STATION NETWORK

BACKGROUND OF THE INVENTION

The present invention relates to wireless data communication networks and more particularly to such a network which employs mobile wireless stations and which will automatically organize itself for efficient operation.

While it has previously been proposed to arrange wireless data communications stations in a hierarchical network, such systems have typically contemplated that the network backbone i.e., the gateway stations and channels which implement longer distance links, will typically be essentially pre-selected or predetermined even though non-gateway stations may switch affiliation or principal contact from one gateway or cell-base to another. Further, the gateway stations are typically immobile or stationary. For example, in cellular telephone networks there can be a hand-off of a mobile unit from one base station to another, the hand-off being initiated by the base station.

There are, however, situations in which it is disadvantageous to have to pre-determine or pre-select what stations are going to function as backbone gateways. Examples of such situations are military battlefield operations where deployment of facilities may be changed rapidly and erratically and a gateway station may be lost unpredictably. In the civilian context, disaster relief operations may also need to deploy equipment quickly and it is desirable that effective and pervasive communications be made easily available without having to promulgate a network structure from a central command post or authority. As will also be understood, it is highly desirable that it not be necessary to provide a variety of different equipment configurations or capabilities. Rather, it is preferable that a single standard operational configuration be usable at all stations in a flexible network.

Among the several objects of the present invention may be noted that the provision of a mobile radio communications network in which a plurality of mobile stations will automatically organize themselves into a hierarchical network in which some of the stations operate as message gateways for a cluster of stations, thereby forming a network backbone; the provision of such a network which employs a plurality of stations which are essentially similar to each other; the provision of such a network in which the cluster gateways operate at a relatively high power level to provide longer distance network links; the provision of such a network in which unneeded redundancy of channels is avoided; the provision of such a network which possesses the ability to adaptively reorganize in the face of movement or destruction of cluster gateways; the provision of such a network which is highly reliable, which is easily implemented and which is of relatively simple and inexpensive construction. Other objects and features will be in part apparent and in part pointed out hereinafter.

SUMMARY OF THE INVENTION

A mobile radio communications network of the present invention employs a plurality of similar mobile stations each of which can transmit on either a relatively high power level or a relatively low power level. The invention employs a method of operating each station so as to automatically organize a group of stations into a multi-layered network for relaying messages from station to station with some of the stations operating at the relatively high power level as message gateways for a cluster of other stations, thereby to form a network backbone. In accordance with the method, each station attempts initially to establish an affiliation link at the lower power level to an existing gateway. If that attempt does not succeed within a randomly determined length of time, the station switches to the higher power level and commences operation as a cluster gateway. Data which identifies the other stations affiliating with each cluster gateway is communicated between the cluster gateways. Preferably, each cluster gateway periodically determines if any other cluster gateway is within affiliation range and, if so, initiates a procedure which terminates cluster gateway status of the respective station if that termination will not reduce connectivity of the network backbone below a preselected level.

BRIEF DESCRIPTION OF THE DRAWINGS

Corresponding reference characters indicate corresponding parts throughout the several views of the drawings.

DESCRIPTION OF THE PREFERRED EMBODIMENTS

As indicated previously, the present invention relates in substantial part to a method of operating individual mobile radio stations in a manner such that they will automatically organize or configure themselves into an efficient network. Each station is assumed to have both transmitting and receiving capabilities, i.e. to be operational as a transceiver. The network may, for example, be operated as a packet switched digital data network for communicating messages from one station to another once configuration is established. As is understood by those skilled in the art, procedures exist for routing messages over a network, even when the configuration of the network may occasionally change. Likewise, there are procedures for measuring or rating the connectivity of a network in a particular configuration or in alternate configurations. The present invention does not directly concern these procedures though their availability is assumed in the following description.

As also indicated previously, the present invention employs a plurality of stations which are essentially similar particularly in that each station can transmit at either a relatively high power level or at a relatively low power level, suitable for relatively long or relatively short network links respectively. Likewise, each station can operate at least in two basic modes, one of the modes being as a message gateway for a cluster of other (non-gateway) stations, the other mode being a relatively local mode operating as a non-gateway station. The cluster gateway stations operate at relatively high power level to communicate with other cluster gateway stations and thereby form a network backbone typically providing longer distance network links.

Figure 1:
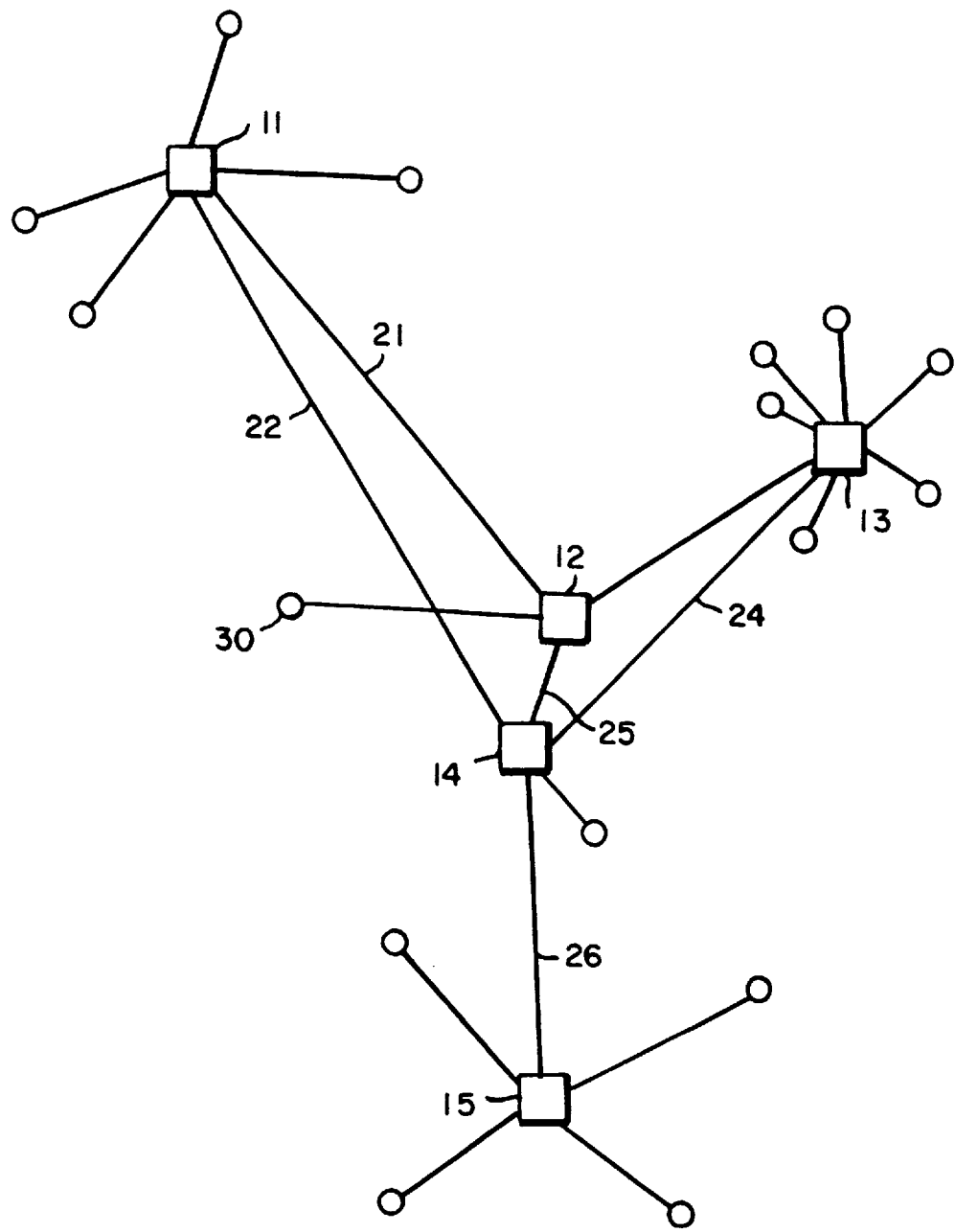
FIG. 1 is a diagram illustrating a communications network in accordance with the present invention.

Referring now to FIG. 1, the communications network illustrated there employs a plurality of similar mobile stations, some of which are operating as cluster gateways. The cluster gateway stations are indicated by squares and are designated by reference characters 11–15, whereas the non-gateway stations are indicated by circles and, for the most part, are not identified by individual reference characters. Established channels or data communications links connecting various of the cluster gateways are designated by reference characters 21–26. Links connecting non-gateway stations to gateway stations are shown by similar lines but, for the most part, without identification by individual reference characters.

While FIG. 1 illustrates a particular interconnection of the various stations shown, it should be understood that this configuration of connections is not pre-determined and that other patterns of connections might easily arise in accordance with the present invention. Further, the pattern of connections can change during operation, both to accommodate the introduction of new stations and to allow for the withdrawal or movement of one of the attached stations. The mode of operation of each station is controlled by an embedded microprocessor as is becoming increasingly conventional and the method of operation described herein is intended to be implemented automatically by the programming of the microprocessors in accordance with the teaching herein.

Figure 2:
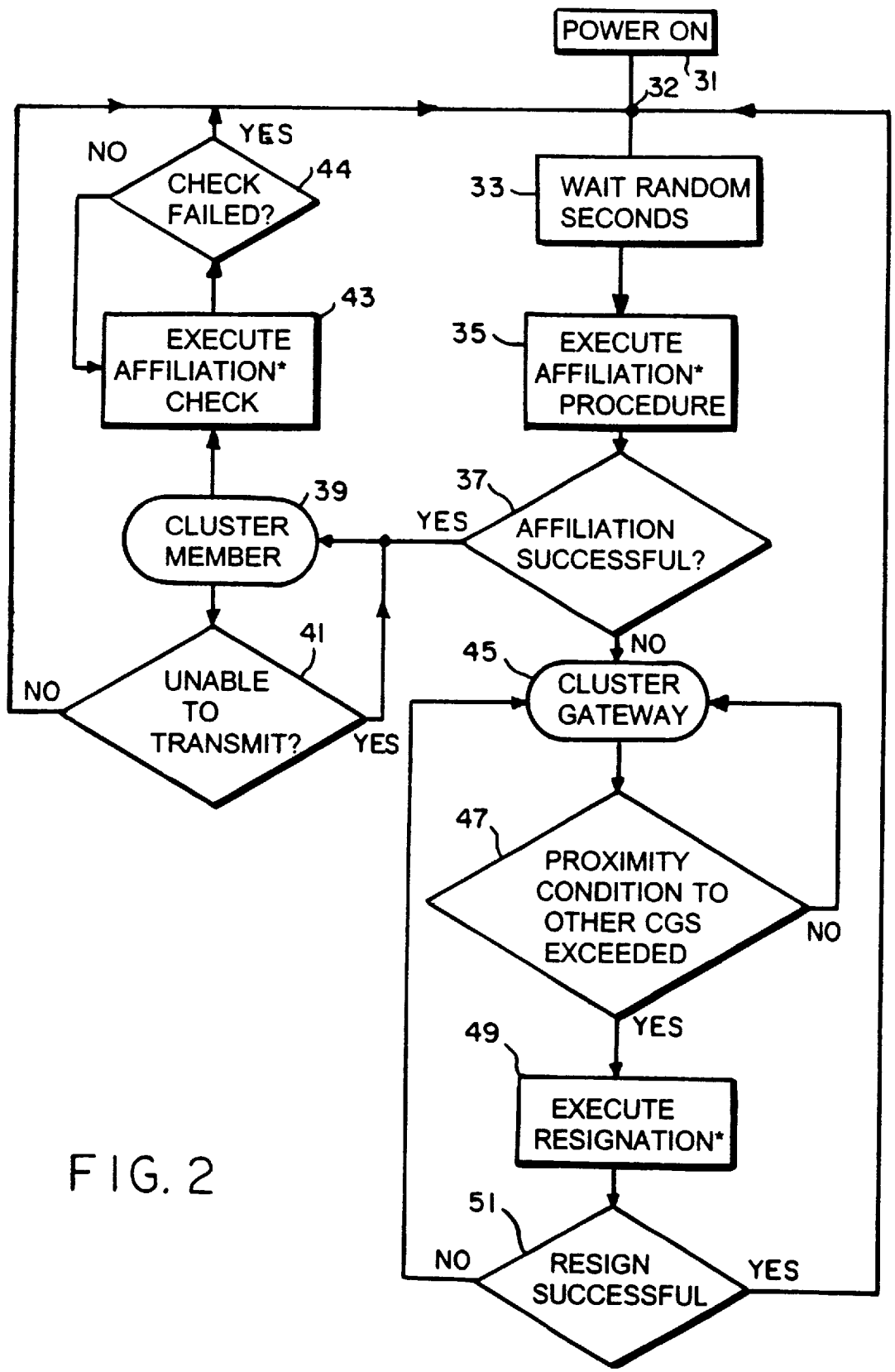
FIG. 2 is a flow chart illustrating of the overall method of operation of each of the stations in the network of FIG. 1.

In the overall method, shown in FIG. 2, of operating each station so as to effect the automatic organization of stations, certain of the procedures incorporated in the method are described initially only in general functional terms and are then described in greater detail with respect to others of the drawings.

With reference to FIG. 2, each station is initially activated as initially indicated by the POWER on step 31. A delay of random duration, within preselected bounds, is provided as indicated at step 33. As indicated, this random delay is also introduced in several other of the program flow paths which merge at juncture 32 and is influential in implementing the general and fair allocation of roles to the various stations. After the delay, the station executes an affiliation procedure 35 during which it attempts to affiliate with an existing cluster gateway station. This affiliation procedure is described in greater detail hereinafter with reference to FIG. 3.

If the affiliation procedure is successful, as tested at block 37, the station commences operation as a cluster member as indicated at block 39 with operation being at the lower power level.

As is understood by those skilled in the art, packet switched network procedures typically include acknowledgement messages which confirm that a message transmitted has been received by the intended station and thus, each station is able to determine, on an ongoing basis, if it continues to be able to communicate through the network. This testing is indicated at reference character 41 and, so long as the station continues to be able to communicate, it remains as an existing cluster member. However, if at some point the station determines that it is no longer able to communicate, the program flow returns to the juncture indicated by reference character 32 and, after the random delay re-executes the affiliation procedure 35. During the affiliation procedure, the station may affiliate with a different cluster gateway, assuming that it is within range of any such station. In addition, each cluster member periodically executes an affiliation check procedure as indicated at block 43. The affiliation check procedure is described in greater detail hereinafter with reference to FIG. 4. So long as the affiliation check is satisfactory, the station again remains as a cluster member with its pre-existing affiliation. If a check is failed, the program flow again returns to the juncture point 32 and, after the random delay, re-executes the affiliation procedure 35.

If, on any attempt to execute the affiliation procedure 35, the attempt fails, the station enters operation as a cluster gateway as indicated by reference character 45. As indicated previously, a station operating as cluster gateway transmits at the higher power level. One of the additional functions performed by each station operating as a cluster gateway is to periodically broadcast so called beacon messages which establish the stations presence and its availability to operate as a gateway for a cluster of member stations. Further, each cluster gateway station will periodically transmit messages, at least to the other gateway stations, which identify at least the members which leave affiliated with that gateway. Thus, the gateway stations can maintain a data structure indicating the present constituency of the network and the configuration of the network backbone. When it is stated herein that a station is operating at the higher power level, what is meant is that the station is operating at the higher power level in transmitting messages over the links which are established between gateway stations. It should not be inferred that the station will necessarily operate at the higher power level when communicating with affiliated member stations when that level of power would not be needed.

Periodically, each gateway station tests its proximity conditions to other gateway stations, e.g., by signal strength measurements or using other data available through the exchanging of messages by the cluster gateway stations which make up the network background. If the test indicates that proximity conditions are exceeded, i.e., that the particular station's operation as a gateway is possibly redundant and/or unnecessary, the station executes a resignation procedure as indicated at reference character 49. this resignation procedure is described in greater detail with reference to FIG. 5. If the conditions for resignation are met as tested by the procedure indicated by reference character 51, the operational procedure returns to the juncture point 32 and after the random delay, again attempts the affiliation 35 procedure during which the station may commence operation as a cluster member rather than a cluster gateway as previously.

If the conditions are not met, the station remains in operation as a cluster gateway station as indicated at reference character 45.

Figure 3:
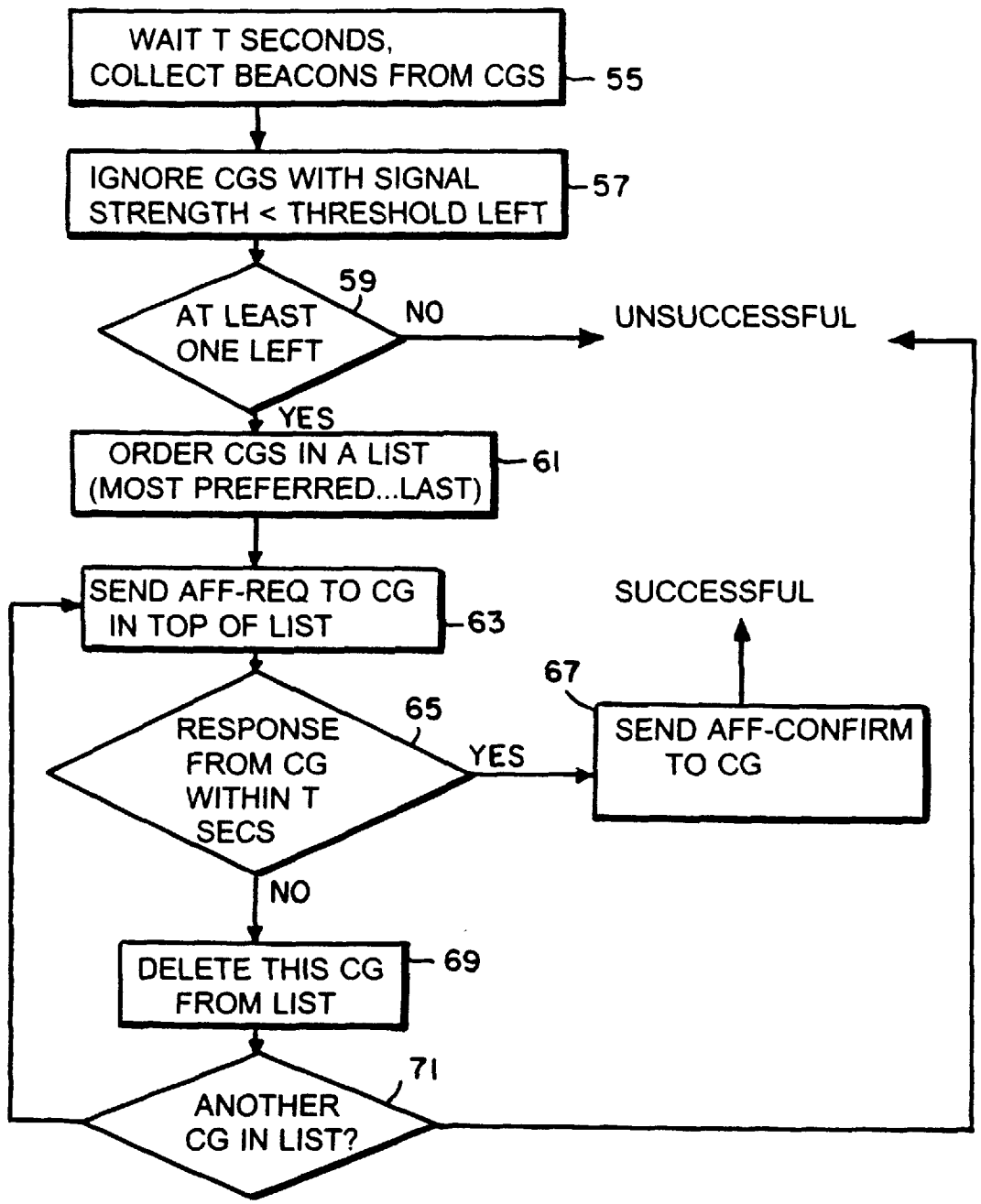
FIG. 3 is a flow chart illustrating an affiliation procedure employed in the method of FIG. 1.

With reference to FIG. 3, a station executing the affiliation procedure 35 collects beacons from all gateway stations within range and establishes a list of such beacons as indicated by reference character 55. Gateway stations with signal strengths below a pre-selected threshold are ignored as indicated at block 57. If no gateway stations on the list are left, as tested at block 59, the affiliation procedure is terminated as unsuccessful, equivalent to a NO result from the procedure as indicated at block 37 in FIG. 2.

The available gateway stations, i.e., those with sufficient signal strength, are ordered in a list progressing from the most preferred or most powerful to the least. This is indicated at reference character 61. As will be understood, the beacon collection and ordering procedure can also be implemented as a continuous or background operation so as to maintain a "preferred list" of gateway stations since such a list is also utilized at other points in the overall procedure as described hereinafter.

As indicated at reference character 63, an affiliation request message is then sent to the gateway station which is most preferred, i.e., the one at the top of the ordered list as indicated at reference character 63. If, within a predetermined time interval, a response message is received from the addressed gateway station, the candidate affiliate member sends off a message confirming its affiliation to that gateway station, as indicated at block 67, and the procedure is terminated as being successful, i.e., a YES decision out of the test 37 of FIG. 2.

If the candidate member does not receive a response message from the addressed gateway station, that gateway deleted from the list as indicated at block 69. If no other possible gateway station exists on the list, as tested at block 71, the procedure is terminated as unsuccessful. If there is another possible gateway station which affiliation would be appropriate, the procedure returns to the block 63 so that an affiliation request can be sent off to that gateway station.

Figure 4:
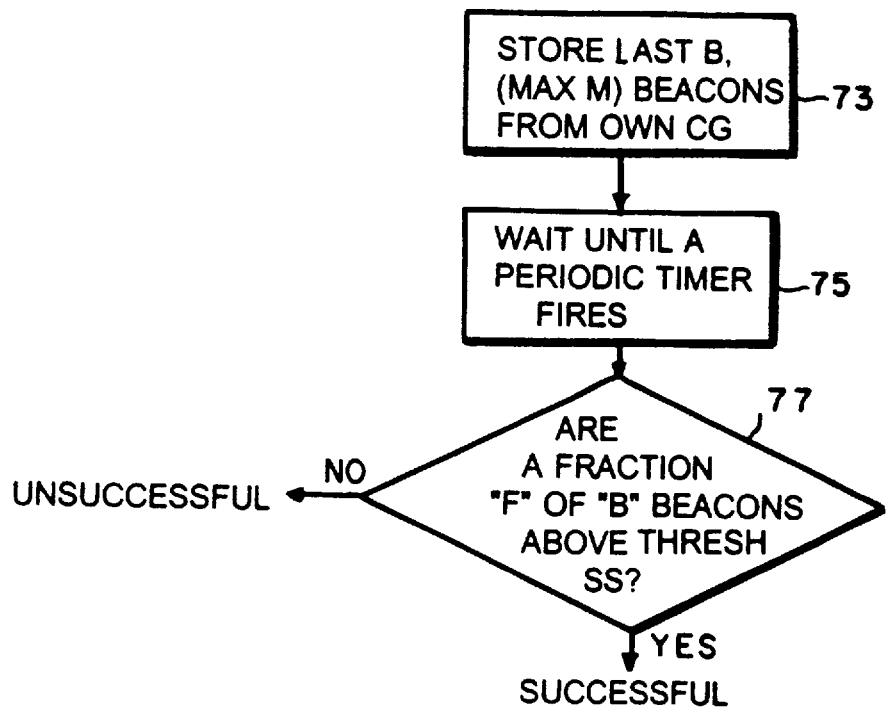
FIG. 4 is a flow chart illustrating an affiliation check procedure employed in the method of FIG. 2.

In the affiliation check procedure of FIG. 4, each member station stores, in an appropriate data structure, a number of "b" recent beacons from its own gateway, i.e., the gateway station with which it is affiliated. The data structure includes the signal strength of the various beacons. Periodically, as determined by a timer step 75, a test is performed, as indicated at reference character 77, to determine if a predetermined fraction of the beacons are of an amplitude which is above a threshold signal strength value. In other words, the member determines whether communications with the current gateway are reliable. If the fraction criteria is met, the affiliation check ends as being successful and, if not, it ends as being unsuccessful, this being the test indicated by reference character 43 in FIG. 2.

Figure 5:
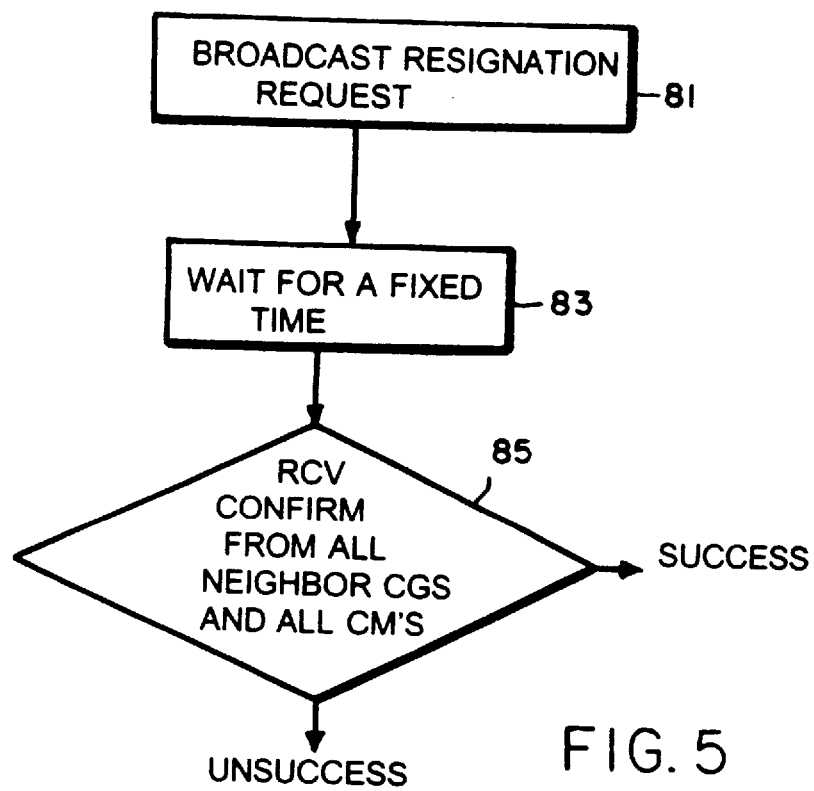
FIG. 5 is a flow chart illustrating a resignation check employed in the method of FIG. 1.
Figure 6:
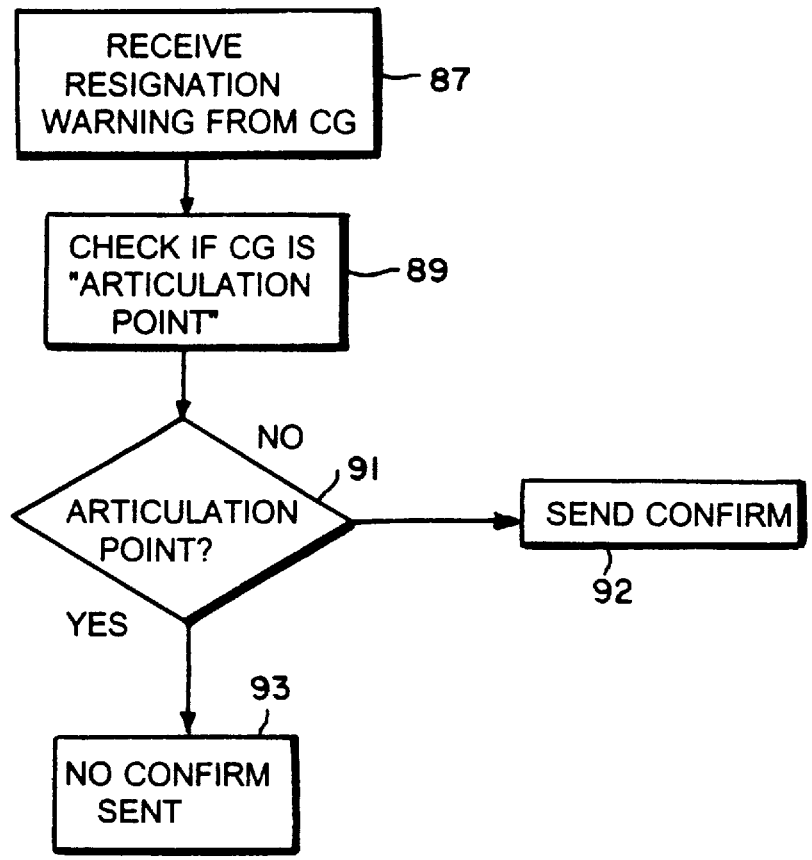
FIG. 6 is a further resignation check procedure also employed in the method of FIG. 1.
Figure 7:
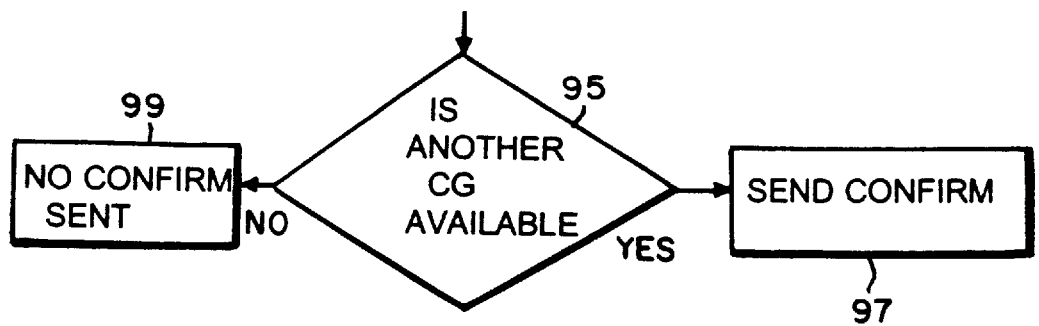
FIG. 7 is a still further resignation check procedure employed in the over all method of FIG. 1.

In the procedure of FIG. 5, which further illustrates the resignation check procedure identified by reference character 49 in FIG. 2, a station, presently acting as a gateway, broadcasts a resignation request message as indicated at block 81. Assuming they receive the request message, the linked cluster stations and affiliated member stations execute check procedures, as illustrated in FIG. 6 and 7 respectively, and send response messages as appropriate. After predetermined length of time, determined as indicated at block 83, the acting station determines if it has received resignation confirmation messages from all neighboring gateway stations and all member stations affiliated with it. If all such other stations have sent such message and they have been received by the resigning gateway station, the procedure terminates as successful. If any neighboring gateway station or affiliated member station does not provide such a confirming message, the procedure terminates as unsuccessful and the station continues in its role as a gateway.

Each linked or neighboring gateway station receiving a resignation request from another gateway station, i.e., as broadcast at step 81 in FIG. 5, executes the procedure illustrated in FIG. 6. Using the data which the station has collected regarding the configuration of the network, the receiving gateway station checks to see if the requesting gateway station is an articulation point in the network backbone configuration. As is understood by those skilled in the art, the removal of a node at an articulation point would break the connectivity of the network backbone. If the requesting station is an articulation point, as tested block 89, the present gateway station does not, at block 91, send a confirmation message. Accordingly, the requesting gateway station will be blocked from resigning.

If the requesting station is not an articulation point, the gateway station receiving the resignation request sends the appropriate confirmation message, as indicated at block 93, so that the requesting station can resign if all other affected station also confirm.

If a non-gateway or member station receives a resignation request from the gateway station with which it is affiliated, the member station checks, as indicated at block 95, to determine whether another gateway station is available for affiliation, this check being made using the data in the list prepared at step 61 in the procedure of FIG. 3 or from the "preferred" list if the beacon collection and ordering procedure is being performed as a background task. If another gateway station is available for affiliation, the appropriate confirmation message is sent, as indicated at block 97. On the other hand, if no alternate gateway station is available, no confirmation message is sent, as indicated at block 99, so that the proposed resignation is inhibited.

While the resignation check illustrated in FIG. 6 inhibits resignation if backbone connectivity is broken, it should be understood that there are various ways of measuring connectivity in a network and a decision to inhibit resignation may be predicated on a reduction in connectivity level below a preselected level according to measurements made in accordance with these known schemes.

By way of illustrating the resignation process, it is useful to consideration the gateway station 12 in the network configuration illustrated in FIG. 1. Station 12 provides a communication path connecting stations 11 and 13 with station 14 but these paths are-redundant since direct paths exist between each station 11 and 13 and station 14. Likewise while gateway station 12 has a member station 30 affiliated with it this station could presumably also affiliate with existing gateway station 14. Accordingly, it can be seen that the resignation of the proposed gateway station 12 from its gateway status could be expected to be allowed in accordance with the procedures of the present invention. Further, when station 12 again attempts affiliation procedure it could be expected to be successful in affiliating as a member with gateway station 14.

While the present invention contemplates a network which includes a plurality of similar stations each of which can transmit at either a high power level or a low power level, it should be understood that such a network can also accommodate non-similar stations. For example, the network could accept messages from single power handheld units which do not incorporate the capability of activity as a cluster gateway but which merely affiliate as members.

Likewise, while two power levels have been described together with a two level network architecture, it should be understood that the method of the invention is inherently recursive. Thus, a three or four level architecture can be straight forwardly implemented, using successively higher power levels to establish longer distance links which couple gateways for clusters of lower level gateways.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a mobile radio communications network employing a plurality of mobile stations, each of which is capable of transmitting, alternatively, at a first power level and at a second power level, said first power level being greater than said second power level, a method of operating each station so as to automatically configure said stations into a multi-tiered network for relaying messages from station to station with some of said stations operating at said first power level as message gateways for a cluster of stations thereby to form a network backbone providing longer distance network links; said method comprising:

attempting to establish an affiliation link at said second power level to an existing gateway and, if that attempt does not succeed within a randomly determined length of time, switching to said first power level and cominencing operation as a cluster gateway, while operating as a cluster gateway, periodically communicating to other cluster gateways, data identifying the other stations which have affiliated therewith and determining if any other cluster gateway is within affiliation range and, if so, initiating a procedure which terminates cluster gateway status if that termination will not reduce connectivity of said network backbone below a preselected level.

2. A method as set forth in claim 1 wherein a station operating as a cluster gateway station periodically broadcasts a beacon signal and wherein a station attempting to establish an affiliation link measures the signal strengths of cluster gateway stations within range to select a cluster gateway station for affiliation.

3. A method as set forth in claim 2 wherein stations operating as cluster gateways measure the signal strengths of beacon signals from other cluster gateway stations to determine whether to initiate said termination procedure.

* * * * *